United States Patent

Beck

[11] Patent Number: 5,826,862
[45] Date of Patent: Oct. 27, 1998

[54] SELF-PUMPING HYDROPNEUMATIC SHOCK ABSORBING STRUT WITH INTERNAL LEVEL REGULATION

[75] Inventor: Hubert Beck, Eitorf-Keuenhof, Germany

[73] Assignee: Fichtel & Sachs AG, Eitorf, Germany

[21] Appl. No.: 760,882

[22] Filed: Dec. 6, 1996

[30] Foreign Application Priority Data

Dec. 7, 1995 [DE] Germany ................. 195 45 662.9

[51] Int. Cl.⁶ ................................................. B60G 17/00
[52] U.S. Cl. ..................................... 267/64.17; 267/64.26
[58] Field of Search ............................. 267/64.16, 64.17,
267/64.19, 64.23, 64.27, 64.21, 64.24, 64.26;
188/269, 298, 322.16, 322.17, 322.19, 312

[56] References Cited

U.S. PATENT DOCUMENTS

| | | | |
|---|---|---|---|
| 3,291,475 | 12/1966 | Allinquant | 267/64.17 |
| 3,554,525 | 1/1971 | de Koning | 267/64.17 |
| 3,593,978 | 7/1971 | Lohr | 267/64.17 |
| 5,062,616 | 11/1991 | Sommer | 188/322.17 X |
| 5,564,680 | 10/1996 | Sano et al. | 267/64.17 |

FOREIGN PATENT DOCUMENTS

| | | |
|---|---|---|
| 1630107 | 2/1971 | Germany . |
| 3316069 | 11/1984 | Germany . |
| 404249632 | 9/1992 | Japan .................. 188/322.17 |

*Primary Examiner*—Robert J. Oberleitner
*Assistant Examiner*—C. T. Bartz
*Attorney, Agent, or Firm*—Nils H. Ljungman and Associates

[57] ABSTRACT

Self-pumping hydropneumatic shock absorbing strut with internal level regulation, with a work cylinder which is filled with oil and is under the pressure of gas cushions, and with a damping piston which can be displaced in this work cylinder. The damping piston slides on the end of a hollow piston rod, the cavity in the piston rod acts as a pump cylinder of a pump rod which is fastened to the work cylinder. Whereby, when the piston rod is extended, damping medium is sucked out of a reserve chamber by way of a suction valve, and when the piston rod is inserted, damping medium is transported into the work chamber by way of a non-return valve and a ring-shaped gap which is formed between a control sleeve and the hollow piston rod. Whereby the pump rod is fastened so that it can move axially, radially and/or with free angular movement in the end wall of the work cylinder.

12 Claims, 7 Drawing Sheets

SELF-PUMPING HYDROPNEUMATIC SHOCK ABSORBING STRUT WITH INTERNAL LEVEL REGULATION

BACKGROUND OF THE INVENTION

1. Field of the Invention

The present invention relates to a self-pumping hydropneumatic shock absorbing strut with internal level regulation, with a work cylinder which is filled with oil and is under the pressure of gas cushions, and with a damping piston which can be displaced in this work cylinder. The damping piston slides on the end of a hollow piston rod with a cavity in the piston rod which acts as a pump cylinder of a pump rod which is fastened to the work cylinder. When the piston rod is extended, damping medium is sucked out of a reserve chamber by means of a suction valve, and when the piston rod is inserted, damping medium is transported into the work chamber by means of a non-return valve and a ring-shaped gap which is formed between a control sleeve and the hollow piston rod.

2. Background Information

German Laid Open Patent Application No. 16 30 107, and German Patent No. 33 16 069, describe self-pumping hydropneumatic shock absorbing struts in which the hollow piston rod is realized in the form of a pump cylinder for a pump rod, so that when the piston rod is extended, damping medium is sucked out of a reserve chamber by means of a suction valve, and when the piston rod is inserted, damping medium is transported into the work chamber by means of a non-return valve and a ring-shaped gap which is formed between a control sleeve and the hollow piston rod. To prevent sudden movements in the pump rod during pumping up or pressurization, the pump rod is held in elastic bearings which are pressed under bias in the floor of the housing. In this manner, jerky or uneven axial movements of the pump rod can be absorbed elastically. This bearing does not allow radial movements or free angular movements, so that the telescoping parts which move in relation to one another, namely the pump rod and the hollow piston rod, are exposed to excessive friction between them, which can lead to a seizing of the parts. To prevent such excessive friction or seizing, it is necessary to also give the telescoping parts the ability to move radially and/or to execute free angular movements, at least in the vicinity of the piston.

OBJECT OF THE INVENTION

The object of the present invention is to create a self-pumping hydropneumatic shock absorbing strut in which the pump rod can be guided quietly and smoothly with respect to the pump cylinder located in the piston rod, and also to reduce the righting or correcting movements.

SUMMARY OF THE INVENTION

The invention teaches that this object can be accomplished by fixing the pump rod in the end wall of the work cylinder so that the pump rod can move axially, radially and/or with angular freedom of motion.

In an additional embodiment, the pump rod can be elastically biased with respect to the end wall. The elastic bias can be advantageously applied by means of elastic washers on the pump rod.

In an additional favorable embodiment, the pump rod can be suspended in the end wall by means of a journal.

In an additional embodiment, the end wall can have a recess in which the pump rod is located, whereby the pump rod can be elastically supported with respect to at least one side of the end wall.

In one preferred embodiment, the pump rod can be located in the end wall with radial clearance.

In one embodiment, the pump rod can, in other words, move axially along the central axis of the shock absorbing strut, radially in any direction at the end wall, and also circumferentially around the inner diameter of the recess in the end wall.

The invention teaches that it can be advantageous if the end wall has a throttle to connect the work chamber to the high pressure chamber. The throttle can be advantageously realized in the form of a recess which can be pressurized by the elastic washers which elastically support the pump rod.

In one embodiment which is favorable from a manufacturing point of view, the journal can be a component of the pump rod.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Preferred embodiments of the invention are explained in greater detail below with reference to the accompanying drawings, in which.

DESCRIPTION OF THE PREFERRED EMBODIMENT

Figure 1:
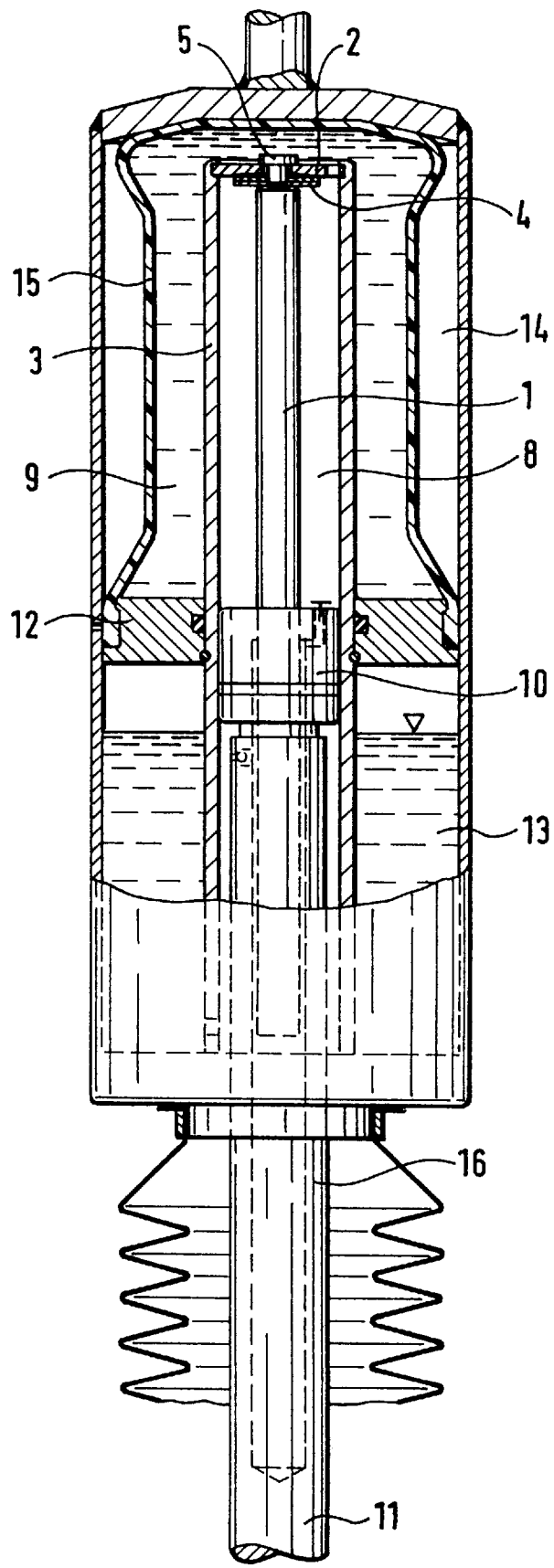
FIGS. 1 and 1a are sectional views which illustrate a self-pumping hydropneumatic shock absorbing strut with internal level regulation.
Figure 1A:
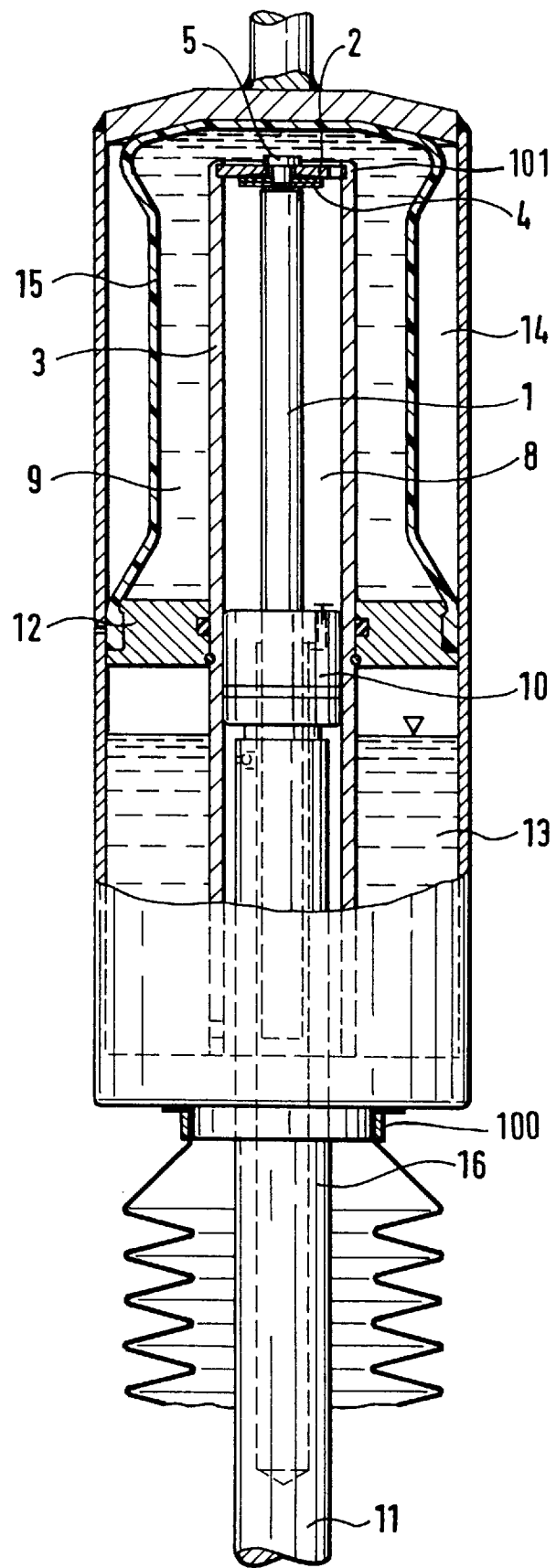

The self-pumping hydropneumatic shock absorbing strut with internal level regulation illustrated in FIGS. 1 and 1a includes a work cylinder 3 of the shock absorbing strut, in which a piston 10 on the end of a hollow piston rod 11 slides. In accordance with one embodiment, illustrated in FIG. 1a, structure for sealing the shock absorbing strut is shown. Specifically, the work cylinder 3 is closed on the one side by a base 101 and on the other side by a cover 100, through which cover 100 the hollow piston rod 11 extends in a sealed manner. The work cylinder 3 is surrounded by a ring-shaped equalization chamber which is filled partly with damping medium and partly with gas. The equalization chamber is divided by a partition 12 into a high pressure chamber 9 and a low pressure chamber 13. A high pressure gas cushion 14 is separated by a membrane 15 from the high pressure chamber 9 which is filled with damping medium. In the low pressure chamber 13, the damping medium and a low pressure gas cushion are not separated from one another. The level of the damping medium is indicated in the drawing. At full equilibrium, i.e. when the shock absorbing strut is not pumped up, the same pressure prevails in the low pressure chamber 13 as in the high pressure chamber 9.

The work cylinder 3 has an end wall 2 to which a pump rod 1 is fastened by means of elastic washers 4. The pump rod 1 is immersed in a pump cylinder 16 or cavity of the piston rod 11 and thereby forms a pump device. The pumping device is operated by the spring movements of the shock absorbing strut, which movements are in turn caused by uneven spots in the road.

Figure 1B:
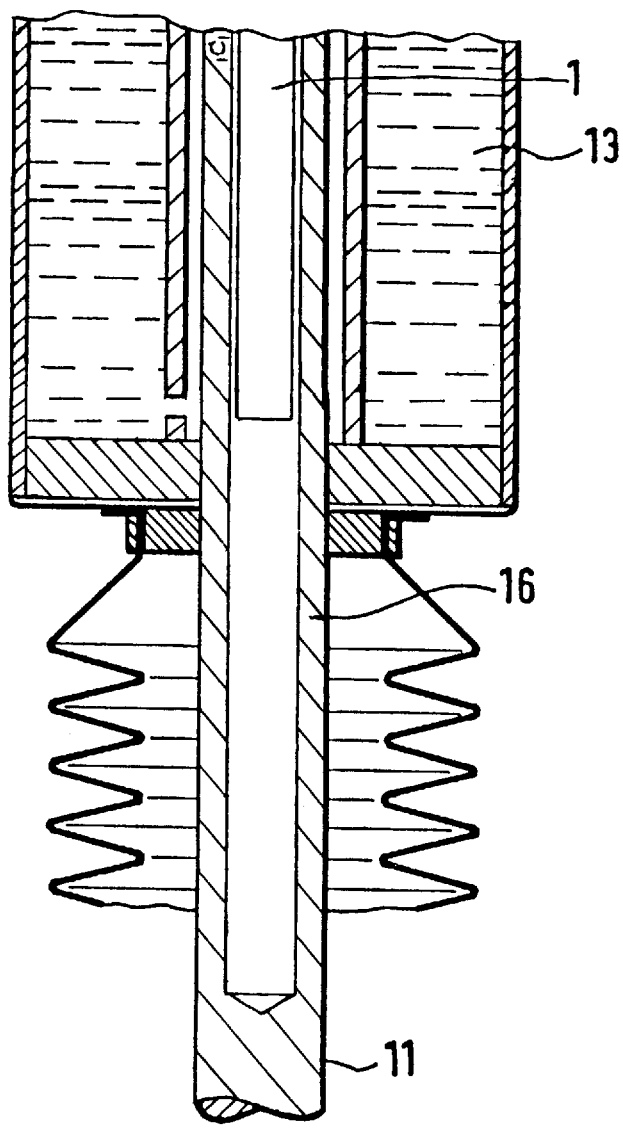
FIG. 1b illustrates more detail of a portion of a hydropneumatic shock absorbing strut.

FIG. 1*b* is a detail of FIG. 1 which illustrates the lower portion of one possible embodiment of a shock absorber, specifically illustrating the hollow piston rod 11.

Figure 2:
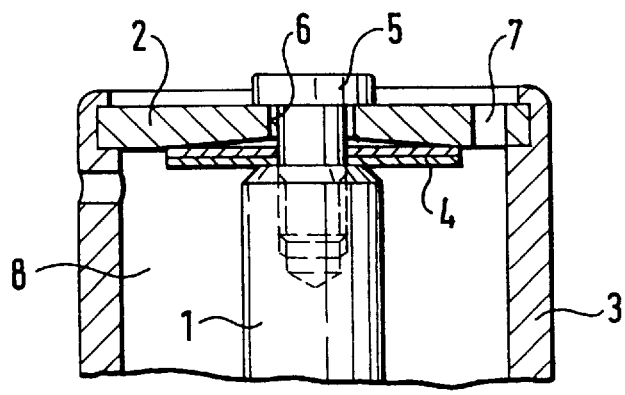
FIGS. 2 to 11 are details which illustrate variousembodiments of the mounting of the pump rod.

FIG. 2 is a detail which illustrates the work cylinder 3, the end wall 2 of which is used to locate the pump rod 1.

The end wall 2 thereby has a recess 6 in which is held a journal 5 to fix the position of the pump rod 1. The axially elastic suspension of the pump rod 1 is ensured by the elastic washers 4 which can move a corresponding axial distance in the end wall 2 as a result of bevels in the end wall 2. The recess 6 is thereby larger in diameter than the outside diameter of the journal 5, so that at this point a corresponding radial compensation can be made. As a result of the superimposition of axial and radial movement, even free angular movements can be performed without any problem in the embodiment illustrated in FIG. 2. The end wall 2 also has a throttle 7 for the passage of the damping medium from a work chamber 8 into the high pressure chamber 9, which throttle 7 applies more or less damping to the damping fluid, depending on the diameter of the throttle 7.

Figure 3:
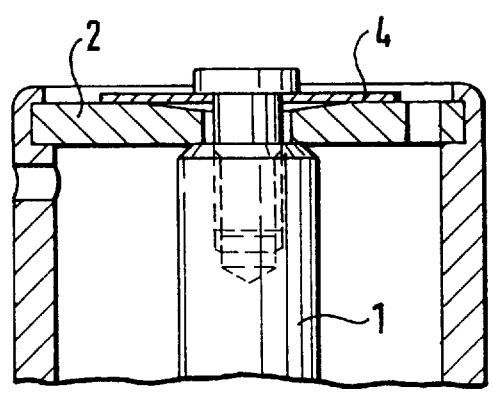

FIG. 3 is essentially the same as the embodiment illustrated in FIG. 2, with the distinction that the elastic washers 4 are located on the side of the end wall 2 farther from the pump rod 1. Otherwise, the function is essentially the same as for the embodiment illustrated in FIG. 2.

Figure 4:
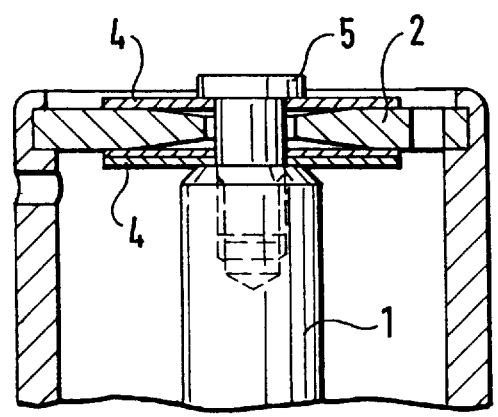

FIG. 4 illustrate an embodiment in which the pump rod 1 is held in the end wall 2 by means of the journal 5, whereby elastic washers 4 are located on both sides of the end wall 2, which elastic washers 4 ensure a damping of the pump rod 1 in the axial direction. Depending on the tightening or retention moment of the journal 5 by means of an internally threaded portion (internal threading not shown) in the pump rod 1, a corresponding pre-determined bias can be applied. in accordance with one embodiment, the end wall 2 can preferably be beveled on both sides.

Figure 5:
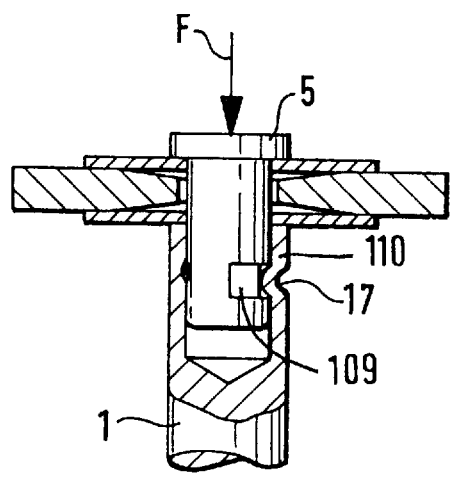

FIG. 5 illustrates a pump rod 1 which is connected to the journal 5 by means of a non-positive connection 17.

In accordance with one embodiment, this non-positive connection can preferably include a recess 109 in the journal 5 and a corresponding projection 110 in the pump rod 1 which engages this recess.

Figure 6:
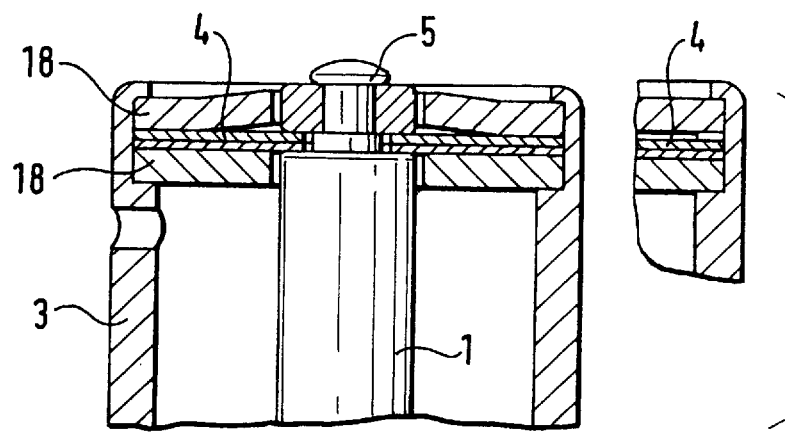
Figure 7:
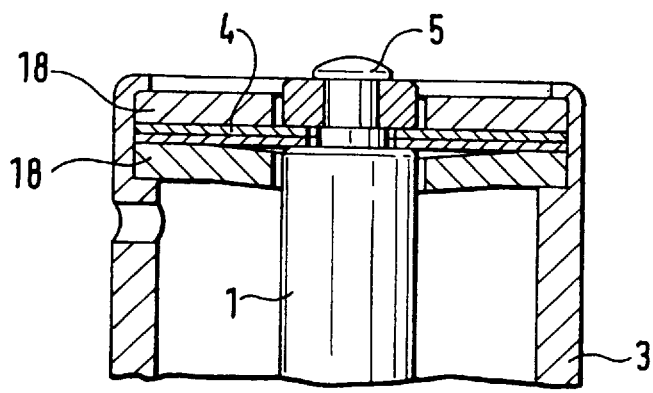
Figure 8:
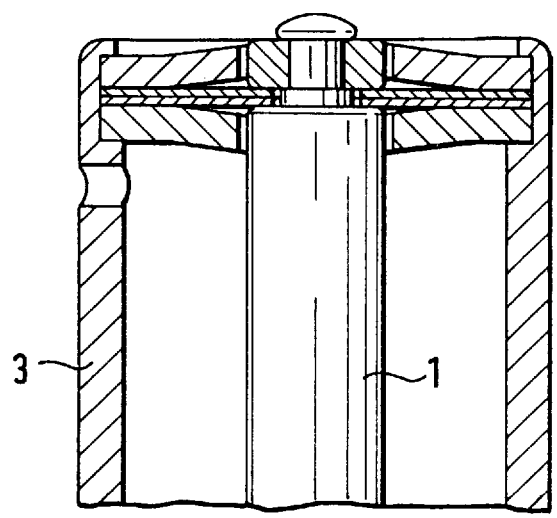

FIGS. 6 to 8 illustrate embodiments in which the pump rod 1 is in each case held by means of the journal 5 in two rigid washers 18 and an elastic washer 4 between them. The rigid washers 18 as well as the elastic washer 4 can thereby be positively connected to one another by rolling in the work cylinder 3 on the corresponding end side.

The embodiments in FIGS. 6–8 differ only in the configuration of the rigid washers 18. In FIG. 6, the rigid washer furthest from the pump rod 1 can be crested away from the elastic washer 4 in the area of the pump rod 1 and can taper towards the sides while the other rigid washer 18 can be flat. In FIG. 7, the rigid washer 18 furthest from the pump rod 1 can be flat while the other rigid washer 18, can taper away from the elastic washer 4 in the area of the pump rod 1. In the embodiment shown in FIG. 8, both rigid washers 18 can taper away from the elastic washer 4 in the area of the pump rod 1.

The embodiments illustrated in FIGS. 9 and 10 again illustrate a rolling of the work cylinder 3, in which the elastic washers as well as a separate thrust collar 19 and an additional washer 20 form the end wall 2 and thus locate the pump rod 1. These versions also show both an axial and a radial compensation, whereby corresponding free angular movements can also be possible.

Figure 9:
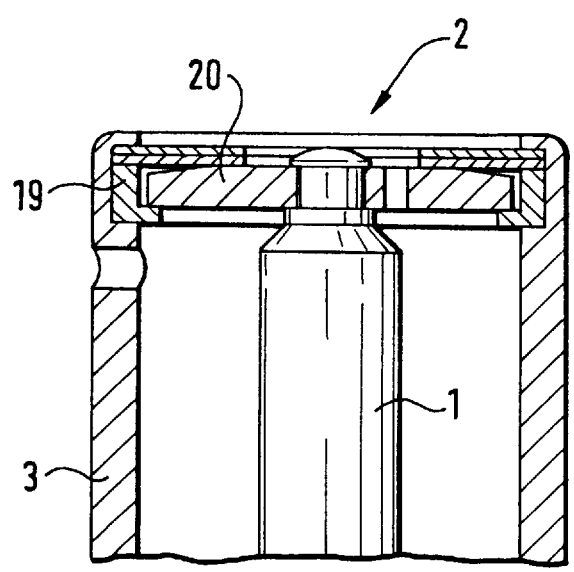
Figure 10:
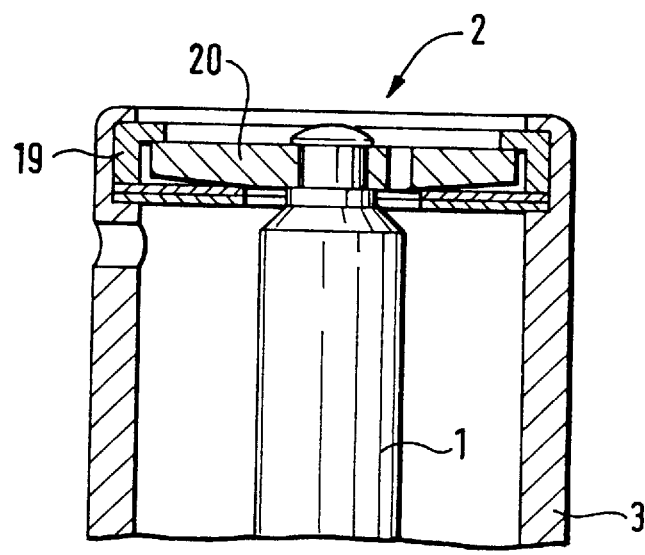

The embodiments in FIGS. 9 and 10 can differ in that the thrust collar 19, as shown in FIG. 9 can be tapered on the side facing the end wall 2 and can be flat on the other side. In the embodiment shown in FIG. 10, the thrust collar 19 can be flat on the side facing the end wall 2 and can be tapered on the other side.

Figure 11:
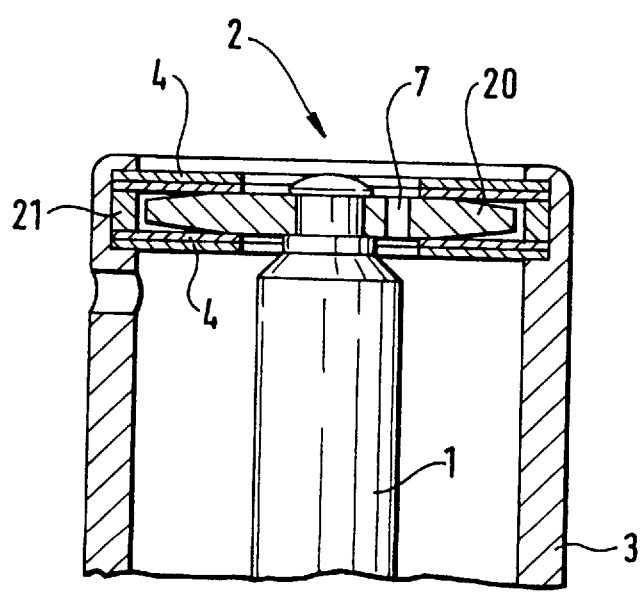

FIG. 11 again illustrates a work cylinder 3 in whose end-side rolling elastic washers 4 form the end wall 2 by means of a spacer ring 21, together with the additional washer 20. As a result of the outwardly beveled lateral surfaces of the additional washer 20, free angular movements of the pump rod 1 can also be executed, while the axial movements of the pump rod 1 are possible on account of the elastic washers 4, and the radial compensation is performed by means of a corresponding smaller size of the additional washer or disc 20 with respect to the inside diameter of the spacer ring 21. In this embodiment, too, the throttle 7 is in the form of a boring. Instead of the throttle 7, however, it is also possible to locate corresponding throttle valves (not shown) in the piston 10 between the two work chambers 8.

One feature of the invention resides broadly in the self-pumping hydropneumatic shock absorbing strut with internal level regulation, with a work cylinder which is filled with oil and is under the pressure of gas cushions, and with a damping piston which can be displaced in this work cylinder, which damping piston slides on the end of a hollow piston rod, the cavity in which piston rod acts as a pump cylinder of a pump rod which is fastened to the work cylinder, whereby when the piston rod is extended, damping medium is sucked out of a reserve chamber by means of a suction valve, and when the piston rod is inserted, damping medium is transported into the work chamber by means of a non-return valve and a ring-shaped gap which is formed between a control sleeve and the hollow piston rod, characterized by the fact that the pump rod 1 is fastened so that it can move axially, radially and/or with free angular movement in the end wall 2 of the work cylinder 3.

Another feature of the invention resides broadly in the shock absorbing strut characterized by the fact that the pump rod 1 is elastically biased with respect to the end wall 2.

Yet another feature of the invention resides broadly in the shock absorbing strut characterized by the fact that the elastic bias is applied to the pump rod 1 by means of elastic washers 4.

Still another feature of the invention resides broadly in the shock absorbing strut characterized by the fact that the pump rod 1 is suspended in the end wall 2 by means of a journal or neck or pivot 5.

A further feature of the invention resides broadly in the shock absorbing strut characterized by the fact that the end wall 2 has a recess 6 to locate the pump rod 1, whereby the pump rod 1 is elastically supported with respect to at least one side of the end wall 2.

Another feature of the invention resides broadly in the shock absorbing strut characterized by the fact that the pump rod 1 is held in the end wall 2 with radial clearance.

Yet another feature of the invention resides broadly in the shock absorbing strut characterized by the fact that the end wall 2 has a throttle 7 to connect the work chamber 8 to the high pressure chamber 9.

Still another feature of the invention resides broadly in the shock absorbing strut characterized by the fact that the throttle 7 is a recess which is pressurized by the elastic washers 4 which elastically hold the pump rod 1.

A further feature of the invention resides broadly in the shock absorbing strut characterized by the fact that the journal 5 is a component of the pump rod 1.

Examples of shock absorbers having structures which may be used in conjunction with embodiments of the present invention, can be found in the following U.S. Pat. Nos.: 5,551,531; 5,547,050; 5,522,483; 5,509,512; 5,480,129; 5,477,949; 5,467,851; 4,850,460; 4,802,561; 4,785,920; 4,650,042; 4,993,693; 4,577,840; and 4,502,672.

The following U.S. patent applications, which have structures which could be incorporated in embodiments of the present invention as self-pumping hydropneumatic shock absorbing struts with internal level regulation: U.S. Ser. No. 08/761,358. attorney docket no. NHL-FIS-236, (see especially FIGS. 1 and 2), corresponding to Federal Republic of Germany Patent Application no. 195 45 661.0, having inventor Hubert Beck, and filed in the Federal Republic of Germany on Dec. 7, 1995; U.S. Ser. No. 08/772,180, attorney docket no. NHL-FIS-234, corresponding to Federal Republic of Germany Patent Application no. 195 47 535.6-12, having inventor Hubert Beck, and filed in the Federal Republic of Germany on Dec. 20, 1995; and U.S. Ser. No. 08/769,663, attorney docket no. NHL-FIS-235, (see especially FIG. 1), corresponding to Federal Republic of Germany Patent Application no. 195 47 536.4, having inventor Hubert Beck, and filed in the Federal Republic of Germany on Dec. 20, 1995; each having the same assignee as the present invention, are hereby incorporated by reference as if set forth in their entirety herein.

The components disclosed in the various publications, disclosed or incorporated by reference herein, may be used in the embodiments of the present invention, as well as, equivalents thereof.

All of the patents, patent applications and publications recited herein are hereby incorporated by reference as if set forth in their entirety herein.

The corresponding foreign patent publication applications, namely, Federal Republic of Germany Patent Application No. 195 45 662.9-21 filed on Dec. 7, 1995, having inventor Hubert Beck, and DE-OS 195 45 662.9-21 and DE-PS 195 45 662.9-21, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A shock absorbing strut for a motor vehicle comprising:

a first end and a second end;

a longitudinal axis extending from said first end to said second end;

a work cylinder defining a chamber therein, said work cylinder containing a damping fluid;

said first end of said strut comprising a structure to connect said strut to a first part of a motor vehicle;

said second end of said strut comprising a structure to connect said strut to a second part of a motor vehicle;

a hollow piston rod having a cavity disposed therein;

said cavity being substantially cylindrical and being disposed substantially along the longitudinal axis;

said hollow piston rod sealingly projecting into said work cylinder and being axially displaceable within said work cylinder;

a piston being affixed to said piston rod;

said piston being slidingly disposed within said work cylinder to sealingly divide said chamber into first and second chambers;

a gas cushion disposed about said work cylinder;

said gas cushion being disposed adjacent said first chamber;

said work cylinder having an end wall;

said end wall being disposed at said first end of said strut;

said end wall being substantially transverse to the longitudinal axis;

a pump rod;

said pump rod extending into said cavity of said hollow piston rod;

a structure to fasten said pump rod to said end wall of said work cylinder;

said fastening structure being configured and disposed to provide a recess to provide space for a fluid and thus provide play between said pump rod and said end wall of said work cylinder;

said fastening structure being configured and disposed to allow said pump rod to move at least one of axially, radially and angularly with respect to said first end of said work cylinder;

said fastening structure comprising a biasing structure to elastically bias said pump rod with respect to said end wall;

said biasing structure comprising at least one elastic washer;

said at least one elastic washer being disposed adjacent said end wall;

said fastening structure comprising a journal;

said end wall comprising a hole disposed therethrough;

said journal being disposed through said hole in said end wall;

said journal being disposed to fasten said pump rod to said end wall;

said end wall comprising a recess to receive said pump rod;

said recess being disposed substantially along the longitudinal axis;

said recess being disposed about a portion of said hole through said end wall;

said pump rod having an outer diameter, said outer diameter being substantially transverse to the longitudinal axis;

said recess having a conical shape;

said recess having a diameter;

said hole through said end wall having a diameter;

said diameter of said recess being greater than said diameter of said hole through said end wall; and said diameter of said recess being greater than said outer diameter of said pump rod.

2. The shock absorbing strut according to claim 1 comprising:

an additional chamber;

said end wall comprising a passage disposed therethrough; and said passage being disposed to connect said first chamber to said additional chamber of said shock absorbing strut.

3. The shock absorbing strut according to claim 2 comprising one of a), b) and c):

a) said journal comprising a threaded portion;
said pump rod comprising a threaded opening to receive said threaded portion; and
said threaded portion of said journal being screwed into said pump rod;

b) said journal comprising an integral extension of said pump rod; and c) said journal comprising a recessed portion;
said pump rod comprising a projection disposed adjacent said recessed portion; and
said journal being fastened to said pump rod by said recessed portion and said projection.

4. The shock absorbing strut according to claim 3 wherein said at least one elastic washer is disposed to pressurize said passage through said end wall.

5. The shock absorbing strut according to claim 4 wherein:

said at least one elastic washer comprises two elastic washers;

said end wall has first and second sides;

said first side of said end wall being disposed adjacent said pump rod;

said second side of said end wall being disposed opposite said pump rod;

one of said two elastic washers being disposed adjacent said first side of said end wall; and the other one of said two elastic washers being disposed adjacent said second side of said end wall.

6. The shock absorbing strut according to claim 4 wherein:

said end wall comprises two rigid washers;

said at least one elastic washer is disposed between said two rigid washers;

one of said two rigid washers comprises a crested portion; and said crested portion of said one of said two rigid washers is disposed to extend away from said at least one elastic washer.

7. The shock absorbing strut according to claim 4 wherein:

said at least one elastic washer comprises two elastic washers;

said end wall comprises:
a spacer ring disposed to separate said two elastic washers;
said spacer ring being disposed between said elastic washers; and
a rigid washer disposed within said spacer ring;

said rigid washer being substantially round and having an outer circumference;

said rigid washer comprising a beveled surface about the outer circumference of said rigid washer; and said beveled surface being configured and disposed to allow said pump rod to move circumferentially with respect to said end wall.

8. In a shock absorbing strut for a motor vehicle, the strut having a first end and a second end and a longitudinal axis extending from the first end to the second end; the strut comprising a work cylinder defining a chamber therein, the cylinder containing a damping fluid; the first end of the strut comprising a structure to connect the strut to a first part of a motor vehicle; the second end of the strut comprising a structure to connect the strut to a second part of a motor vehicle; a hollow piston rod having a cavity disposed therein; the cavity being substantially cylindrical and being disposed substantially along the longitudinal axis; the hollow piston rod sealingly projecting into the work cylinder and being axially displaceable within the work cylinder; a piston being affixed to said piston rod; the piston being slidingly disposed within said work cylinder to sealingly divide the chamber into first and second chambers; a gas cushion disposed about the work cylinder; the gas cushion being disposed adjacent the first chamber; the work cylinder having an end wall; the end wall being disposed at the first end of the strut; the end wall being substantially transverse to the longitudinal axis; and a pump rod extending into the cavity of the hollow piston rod;

a fastening structure to fasten the pump rod to the end wall of the work cylinder;

said fastening structure being configured and disposed to provide a recess to provide space for a fluid and thus provide play between the pump rod and the end wall of the work cylinder;

said fastening structure being configured and disposed to allow the pump rod to move at least one of axially, radially and angularly with respect to said first end of said work cylinder;

said fastening structure comprising a biasing structure to elastically bias the pump rod with respect to the end wall;

said biasing structure comprising at least one elastic washer;

said at least one elastic washer being disposed adjacent the end wall;

said fastening structure comprising a journal;

the end wall having a hole disposed therethrough;

said journal being disposed through said hole in said end wall;

said journal being disposed to fasten the pump rod to the end wall;

the end wall comprising a recess to receive the pump rod;

the recess being disposed substantially along the longitudinal axis;

the recess being disposed about a portion of the hole through the end wall;

the pump rod having an outer diameter, said outer diameter being substantially transverse to the longitudinal axis;

the recess having a conical shape;

the recess having a diameter;

the hole through the end wall having a diameter;

the diameter of the recess being greater than the diameter of the hole through the end wall; and the diameter of the recess being greater than the outer diameter of the pump rod.

9. The shock absorbing strut according to claim 8 wherein:

the end wall comprises a passage disposed therethrough;

the passage is disposed to connect the first chamber to another portion of the shock absorbing strut;

said journal comprises one of a), b) and c):
  a) a threaded portion;
    the pump rod comprising a threaded opening to receive said threaded portion; and
    said threaded portion of said journal being screwed into the pump rod;
  b) an integral extension of the pump rod; and
  c) a recessed portion;
    the pump rod comprising a projection disposed adjacent said recessed portion; and
    said journal being fastened to the pump rod by said recessed portion and the projection.

10. The shock absorbing strut according to claim 9 wherein:

said at least one elastic washer comprises two elastic washers;

the end wall has first and second sides;

the first side of said end wall being disposed adjacent the pump rod;

the second side of the end wall being disposed opposite the pump rod;

one of said two elastic washers being disposed adjacent the first side of the end wall; and the other one of said two elastic washers being disposed adjacent the second side of the end wall.

11. The shock absorbing strut according to claim 9 wherein:

the end wall comprises two rigid washers;

said at least one elastic washer is disposed between said two rigid washers;

one of said two rigid washers comprises a crested portion; and said crested portion of said one of said two rigid washers is disposed to extend away from said at least one elastic washer.

12. The shock absorbing strut according to claim 9 wherein:

said at least one elastic washer comprises two elastic washers;

the end wall comprises:
  a spacer ring to separate said two elastic washers;
  said spacer ring being disposed between said two elastic washers; and
  a rigid washer disposed within said spacer ring;

said rigid washer being substantially round and having an outer circumference;

said rigid washer comprising a beveled surface about the outer circumference of said rigid washer; and said beveled surface being configured and disposed to allow the pump rod to move circumferentially with respect to the end wall.

* * * * *